No. 639,465. Patented Dec. 19, 1899.
J. TIMMS.
HOT AIR FURNACE.
(Application filed Aug. 2, 1898.)
(No Model.)
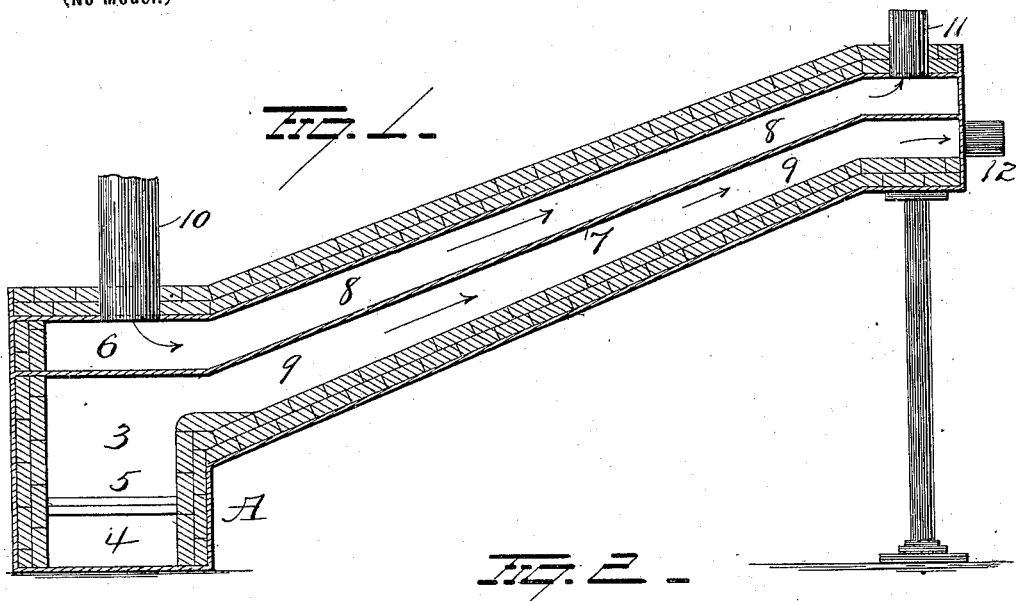
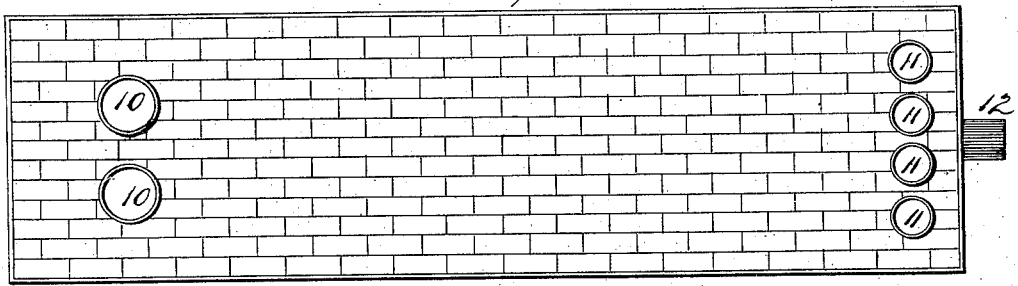
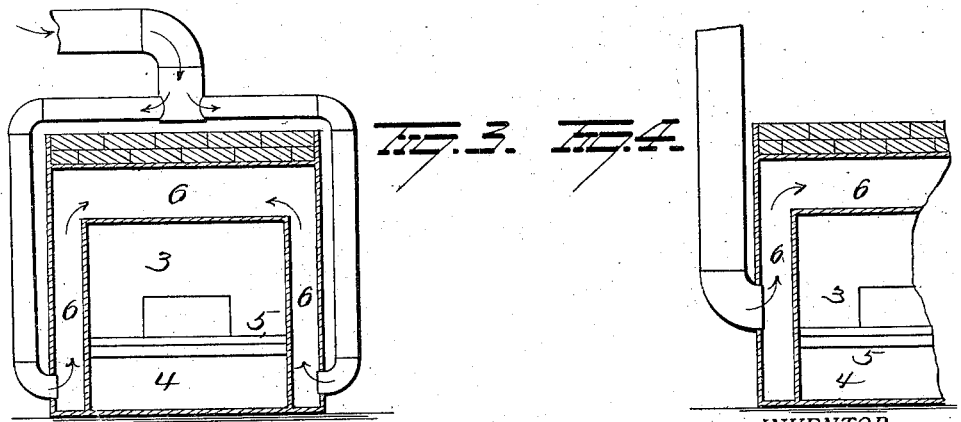
WITNESSES
INVENTOR

UNITED STATES PATENT OFFICE.

JAMES TIMMS, OF COLUMBUS, OHIO.

HOT-AIR FURNACE.

SPECIFICATION forming part of Letters Patent No. 639,465, dated December 19, 1899.

Application filed August 2, 1898. Serial No. 687,526. (No model.)

*To all whom it may concern:*

Be it known that I, JAMES TIMMS, of Columbus, in the county of Franklin and State of Ohio, have invented certain new and useful Improvements in Hot-Air Furnaces; and I do hereby declare the following to be a full, clear, and exact description of the invention, such as will enable others skilled in the art to which it appertains to make and use the same.
My invention relates to an improvement in hot-air furnaces, the object of the invention being to provide a hot-air flue so located with relation to the fire-box and flue for the escape of products of combustion that the air is heated throughout its entire passage through the furnace; and it consists in the details of construction, as will be more fully described, and pointed out in the claims.

In the accompanying drawings, Figure 1 represents a view of my improved furnace. Fig. 2 is a top plan view of same, and Figs. 3 and 4 are views of modifications.

A represents the body portion of my improved furnace, and 1 the inclined elongated extension thereof, which latter is supported at its upper end by one or more pillars 2. The body portion A is provided with a fire-box 3 and an ash-pit 4, said fire-box and ash-pit being separated by a series of grate-bars
5. Located above fire-box 3 is a hot-air chamber 6, which latter is separated from said fire-box by a metal partition 7, which extends from one side wall to the other and from the front wall of the furnace through the fire-box and up through the inclined elongated section 1, dividing this inclined section into two compartments, each of which extends from side wall to side wall of the furnace. The upper compartment 8 is the hot-air flue and is a continuation of the hot-air chamber 6, located above the fire-box, while the lower compartment 9 is the flue through which the products of combustion pass and is in open communication with the fire-box 3. Cold air is introduced into chamber 6 through one or a series of pipes 10, passing into said chamber through the top of section A of the furnace, from which point the air passes through flue 8 and finally out through the distributing-pipes 11, located in the top of the upper end of inclined section 1, while the products of combustion pass out from fire-box 3 through flue 9 and finally into the open air through stack 12. As chamber 6 and its connected hot-air flue 8 are only separated from fire-box 3 and flue 9 by a thin metallic partition, which is wide as the furnace, it will be observed that the cold air will not only be heated as it passes into chamber 6, but will also be highly heated during its entire passage through flue 8, as the products of combustion follow the entire route traversed by said flue 8.

The furnace is preferably constructed of sheet metal, and in order to retain the heat generated therein I deem it advisable to line the fire-box and smoke-flue internally and the hot-air flue externally.

In the modified construction of furnace shown in Fig. 3 hot-air chamber 6 extends across and entirely around the side walls of fire-box 3, and the cold air instead of being introduced through the top of section A of the furnace, as above described, is preferably introduced through the side walls thereof and at points near the bottom of said section A. By this construction a greater heating-surface is provided around the fire-box.

Fig. 4 discloses a form of furnace in which the hot-air chamber 6 is inverted-L shape, said chamber extending upwardly in front of ash-pit 4 and fire-box 3 and thence across the top of said fire-box. In this construction the cold air is introduced through the front wall of the furnace.

In each of these forms the fire-box 3 and ash-pit 4 are provided with the usual doors common with all furnaces.

Having fully described my invention, what I claim as new, and desire to secure by Letters Patent, is—
1. In a hot-air furnace, the combination with a structure comprising an upright portion having a fire-chamber therein and a hollow elongated extension projecting upwardly and outwardly from said upright portion, of a partition in the upright portion forming an air-chamber over the fire-chamber, a partition in the hollow extension dividing the same into two inclined flues, parallel throughout their entire lengths, the upper inclined flue in direct communication at one end with said air-chamber and provided at its other end with a hot-air outlet, and the lower inclined flue communicating at one end with the fire-chamber and provided at its other end with a smoke-outlet.

2. In a hot-air furnace, the combination of an upright portion, an elongated inclined portion closed at all points except at its ends, a fire-chamber in the upright portion, a metallic partition in the inclined portion dividing the same into two flues, one immediately over the other throughout their entire length, an air-chamber in the upright portion in direct communication with one of the flues in the inclined portion, the other flue communicating directly with the fire-chamber, an air-inlet pipe communicating with said air-chamber, an air-outlet pipe communicating with the upper end of the inclined flue with which the air-chamber communicates and a smoke-pipe communicating with the upper end of the other inclined flue.

In testimony whereof I have signed this specification in the presence of two subscribing witnesses.

JAMES TIMMS.

Witnesses:
DAVID A. JONES,
ARTHUR HYDE.